3,772,400
HYDROISOMERIZATION PROCESS AND
CATALYST THEREFOR
James W. Garner and Marvin M. Johnson, Bartlesville, Okla., assignors to Phillips Petroleum Company
No Drawing. Filed Jan. 7, 1972, Ser. No. 216,262
Int. Cl. C07c 5/22
U.S. Cl. 260—683.2  11 Claims

ABSTRACT OF THE DISCLOSURE

The hydroisomerization of olefin containing streams is improved by contacting the feed with a Group VIII metal supported catalyst which has been treated with ammonia. The improved catalyst is much more selective in that it inhibits the polymerization of branched olefins when present in the feed stream. In a further improvement, the selectivity of the treated catalyst is maintained by adding to the feed stream small amounts of a nitrogen containing compound.

BACKGROUND OF THE INVENTION

Field of the invention

This invention relates to hydroisomerization. In a further aspect, this invention relates to hydroisomerization catalysts. In a further aspect, this invention relates to improvements in the hydroisomerization of olefin hydrocarbon streams using an improved palladium on alumina catalyst.

Description of the prior art

Hydroisomerization is a process well konwn in the art. The process is generally applied to mixed olefin refinery streams containing small amounts of diolefins and alkynes. Where subsequent use of the stream requires a high purity feed free from the diolefin and alkyne compounds, hydroisomerization has been found to be a particularly effective processing step. Principally, the reaction is designed to hydrogenate the diolefins and alkyne compounds to monoolefins and to isomerize the terminal olefins in the stream to internal olefins. Thus, this process step has been extensively employed for treatment of a source mixed butenes stream prior to alkylation with isobutane.

Group VIII supported catalysts have been recognized in the art as good hydroisomerization catalysts; see, for example, U.S. Pat. No. 3,531,545 of Sept. 29, 1970. These catalyst compositions are available as items of commerce from various catalyst suppliers.

One problem encountered in the hydroisomerization reaction is that branched olefins in the feed stream readily polymerize (principally to dimers and trimers) under the conditions of treatment. Thus, the selectivity of the hydroisomerization reaction using the Group VIII metal supported catalyst is reduced due to the polymerization of the branched olefins to undesirable heavy materials.

Objects of the invention

It is an object of this invention to improve the selectivity of the hydroisomerization reaction. It is a further object of the invention to provide a catalyst capable of the hydroisomerization of mixed olefin streams. Other objects and advantages of the present invention will be apparent to those skilled in the art from the following summary of the invention, detailed description of the invention, and claims.

Summary of the invention

We have discovered that improved selectivity of the hydroisomerization of olefin streams is obtained by treating a Group VIII metal supported catalyst with ammonia, prior to contact with the mixed olefin stream.

In a further embodiment of our invention, we have discovered that the high selectivity of the improved ammonia treated catalyst can be retained over extended periods by adding to the olefin feed stream a small amount of a nitrogen containing compound.

Further according to our invention, we have discovered a new catalyst having improved selectivity for the hydroisomerization reaction which comprises a Group VIII supported catalyst which has been contacted with an excess of ammonia.

DETAILED DESCRIPTION OF THE INVENTION

The feed streams which are hydroisomerized according to the invention compirse terminal acyclic olefins having from 4 to about 6 carbon atoms per molecule. Substantially pure streams of butene-1, pentene-1, hexene-1, and the like, can be employed if desired. However, the feed stream will usually contain small amounts of diolefins and an alkyne compound, as well as isoolefins, alkyl substituted olefins, and internal olefins, as well as saturated compounds.

Particularly suitable feed streams which are hydroisomerized according to the invention comprise mixtures of hydrocarbons which contain (a) at least one acyclic terminal monoolefin having from 4 to about 7 carbon atoms per molecule, optionally (b) at least one acyclic internal monoolfin having the same number of carbon atoms as (a), and (c) at least one skeletal isomer of (a) and (b). The term "hydroisomerization" as used herein refers to the conversion of such a feed stream wherein the (a) type hydrocarbon is isomerized to the (b) type hydrocarbon in the presence of hydrogen. Preferred feed streams include those comprising mixtures of isobutene and butene-1, isopentene and pentene-1, and the like.

A typical hydrocarbon feed composition found in refinery operations suitable for the process of this invention is a feed stream containing saturated hydrocarbons, isobutylene, butadiene, butene-2 in both the cis and trans forms, butene-1 (the component desired to be isomerized to butene-2), and minor amounts of diolefins. Another typical hydrocarbon feed stream is one containing propane, propylene, butanes, butenes, 3-methyl butene-1, 2-methyl butene-1, 2-methyl butene-2, and minor amounts of diolefins such as 1,3-butadiene. The process stream will either contain sulfur compounds, organic or inorganic in type, one or more, or a sulfur-containing compound, one or more, will be added to the process stream, as taught in U.S. Pat. 3,531,545 mentioned previously.

The sulfur compounds can be any naturally occurring organic or inorganic sulfur compound that can be conveniently added, and may be in the form of gaseous, liquid, or solid materials under normal temperatures and pressures. Examples of suitable sulfur compounds include: sulfides, such as hydrogen sulfide, alkali and alkaline earth metal sulfides; thioalcohols (mercaptans) and alkali and alkaline earth metal salts thereof; thioethers; thioaldehydes; thioketones; disulfides, both organic and inorganic, such as alkali and alkaline earth disulfides; thionacids; thiolacids; dithioacids; thiourea; isothiocyanates; dithiocarbonates (xanthates); or the like. In any of which compound the organic component of the compound may have up to about 10 carbon atoms for alkyl, up to about 18 carbon atoms for cyclic, and be of alkyl, aryl, alkaryl, aralkyl type, and include various substituents on the chain or ring including halide, amino, carboxy, hydroxy, and the like.

The organic sulfur compound can be added as a gas, as a liquid, as a vaporized solid, as a solution, in undiluted form, or in diluted form, using any convenient means known to the art to add a minor amount of such a material to a hydrocarbon feed stream, such that the amount of sulfur-containing compound added is from about 1 to about 50 moles p.p.m. as sulfur.

The catalysts of this invention comprise the noble metals of Group VIII of the Periodic Table of Elements, as listed in the Handbook of Chemistry and Physics, published by the Chemical Rubber Company, in the 49th edition (1969), page B–3. The catalysts intended to be included in the group of noble metals of Group VIII specifically are ruthenium, rhodium, palladium, osmium, iridium, and plantinum.

Any of the usual catalyst supports can be employed, such as alumina (preferred), silica alumina, glass beads, and carbon. Both pelleted and spherical form catalysts are satisfactory.

A preferred catalyst is palladium on a carrier, the carrier preferably being alumna. The catalyst should contain from 0.005 to 1.0 percent palladium on alumina, preferably about 0.01 to about 0.1 weight percent palladium on alumina. The alumina carrier is of a controlled pore diameter to contain about 41.5 weight percent aluminum. A suitable catalyst weighs about 40 to about 52 pounds per cubic foot, has a surface area of about 340 to about 350 square inches per gram, a pore volume of about 0.50 to about 0.60 ml. per gram, and a pore diameter of about 60 to about 70 A.

A commercial catalyst satisfactory for use in this invention is manufactured by Catalysts and Chemicals, Inc., Louisville, Ky., designated as catalyst C–31 and described in Bulletin No. C–31–053. The commercial catalyst contains about 0.05 weight percent palladium on alumina.

Another commercial catalyst satisfactory for use in this invention is manufactured by the Girdler Corporation, Louisville, Ky., designated as catalyst G–55 and described in Data Sheet G–55–562, and contains about 0.03 weight percent palladium on alumina.

In accordance with our invention, the above-described catalysts are treated with excess ammonia prior to contact with the feed hydrocarbons. By excess, it is meant that sufficient amounts of ammonia are used to allow complete uptake by the catalyst. The ammonia treatment is conveniently carried out by purging the catalyst with ammonia, followed by passing ammonia over the catalyst at a pressure of 0–100 p.s.i.g. at a temperature range of 50–900° F. for a period of time from about 5 to 150 minutes or longer. The ammonia can be simply shut in with the catalyst under the conditions set forth above. The ammonia not taken up by the catalyst can be removed from the catalyst by flushing with an inert gas such as nitrogen, although this step is not necessary to provide the improved catalyst. When palladium on alumina catalyst is used, the ammonia is preferably shut in with the catalyst at a pressure of 5–30 p.s.i.g. at a temperature of 200–300° F. for a period of time on the order of from about 10 to 60 minutes.

The ammonia employed is preferably used in the gaseous state undiluted with other gases. However, it is within the scope of the invention to treat the catalyst with an ammonia containing gas which contains other inert gaseous components.

As understood in the art, the Group VIII metal support hydroisomerization catalyst can be regenerated when the activity of the catalyst declines with time due to carbonization of the feed material and deposition on the catalyst. The regeneration is conducted at elevated temperatures using the oxygen containing gas, e.g., air, $CO_2$ flue gases, and the like. The temperature of treatment is dependent upon the particular catalyst used; however, there is generally an upper temperature limit which should not be exceeded where the catalyst is severely degraded. For example, the treatment of a palladium on alumina catalyst should not exceed about 950° F. The regenerated catalyst is then treated with ammonia as described above.

The process is conducted at a reaction temperature of about 225 to 500° F., preferably 250–375° F., and such temperature range is critical to the process of this invention. Lower temperatures are less effective due to the low activity of the catalyst. At higher temperatures, equilibrium restrictions limit the amount of internal olefin that can be obtained by the isomerization process.

This invention can be most effectively practiced at relatively low pressure conditions while maintaining the hydrocarbon most preferably in the vapor phase, although liquid phase operation can be used. Pressures employed are from about 15 to about 1000 p.s.i.g., preferably from about 80 to about 600 p.s.i.g. Hourly space velocities, VHSV, are maintained from about 100 to 10,000, preferably from about 1000 to about 2000, based on standard conditions.

Hydrogen is required in the practice of this invention, preferably being mixed with the hydrocarbon stream prior to contacting the stream with the catalyst, preferably after vaporization of the hydrocarbon. The hydrocarbon can be added undiluted, or added diluted with an inert gas. The hydrogen is necessary to effect double bond isomerization of the 1-olefin with the catalysts of our process. The hydrogen is added in amounts from 0.1 to 15.0 mol percent, preferably in amounts of about 1.0 to about 10.0 mol percent.

As discussed previously, the selectivity of the catalyst of this invention can be maintained over extended periods by adding to the feed small amounts of a nitrogen containing compound. The nitrogen-containing material is represented by the following:

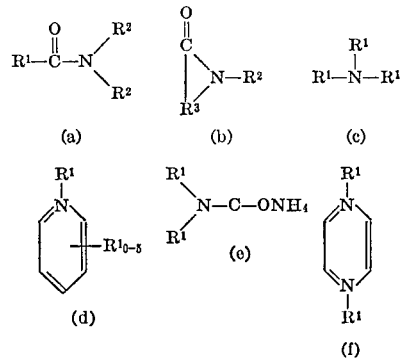

(g) mixtures of $NH_3$ and one or more of $NH_4HCO_3$, $(NH_4)_2CO_3$, and $CO_2$ wherein $R^1$ and $R^2$ are selected from hydrogen, and alkyl, aryl, cycloalkyl groups or combinations of these such as aralkyl or alkaryl, wherein $R^3$ is an alkylene radical having 2–5 carbon atoms; wherein the number of carbon atoms of compounds shown in compounds (a)–(f) does not exceed about 15; and wherein the mixture of (g) contains about 0.01–20 moles of $NH_4HCO_3$, $(NH_4)_2CO_3$, or $CO_2$ per mole of $NH_3$.

Preferably $R^1$ is hydrogen and each $R^2$ is a $C_1$–$C_4$ alkyl radical or a phenyl radical.

Some specific examples of the above-described modifiers are N,N-dimethylformamide, diethylformamide, formamide, N - methylformamide, N - methyl-N-phenylformamide, benzamide, diphenylformamide, N-methylpyrrolidone, N-ethylcaprolacta, ammonia, diethylamine, triethylamine, pyridine, aniline, N-methyl-N-cyclohexylammonium carbamate, ammonium carbamate, quinoline, and the like, and mixtures thereof.

In our experimental work, we have noted that after a certain amount of time, the effect of ammonia treatment (increased selectivity) is diminished. That is, isoalkene dimers and trimers begin to reappear in the reactor effluent. To maintain the high selectivity of the catalyst, sufficient amounts of the nitrogen containing compound are added to inhibit polymerization of the isoalkene.

However, care must be exercised in that an overabundance of the additive in the feed will greatly reduce the effectivenes of the improved catalyst. Thus, care must be taken to add only sufficient amounts of these materials to prevent isoalkene polymerization, avoiding amounts of the nitrogen-containing materials which tend to decrease catalyst activity and/or efficiency.

Generally, the nitrogen-containing compound(s) is added to the feed-stream in amounts of from about 0.001 to about 1,000 parts per million based on the total weight of the feed, preferably from about 1 to about 50 weight p.p.m. Preferably, the additive is present at the start of the conversion reaction. However, these can be added to the feed at incremental intervals, or continuously prior to the time the isoalkene polymers appear in the reactor effluent.

This invention can be carried out in any of the usual processing methods and sequences, including series or parallel flows of reactants and similar modifications and adaptions generally applicable to hydrocarbon processing. Similarly, provision can be made for control of process conditions by the usual instrumentation.

This invention, carried out within the ranges as described hereinbefore, is illustrated by the following examples. The examples, adapted to the isomerization of butene-1 to butene-2, should be considered as illustrative of the general applicability of the process to the feedstocks previously discussed, and without being limitative of the invention.

EXAMPLE I

A hydrocarbon stream was hydroisomerized under operating conditions indicated below using a palladium on alumina catalyst of the type as described hereinbefore. Two runs were made in which the catalyst was not treated with ammonia prior to the conversion reaciton. In 2 additional runs, the catalyst of runs 1 and 2 was regenerated in flowing air admixed with $N_2$, cooled, purged with ammonia, and shut in under an ammonia atmosphere at 30 p.s.i.g., at a temperature of 175° F., for 60 minutes. The pressure decreased to 15 p.s.i.g. at the end of 60 minutes. The catalyst was then used to treat a hydrocarbon feed as shown below in Table I. In Table II conditions of treatment and results are summarized.

TABLE I.—COMPOSITION OF FEED STREAMS
($H_2$-free basis)

| Component | Blend A | Blend B |
|---|---|---|
| Propane, mol percent | 36.15 | 37.23 |
| Isobutane, mol percent | 0.06 | 0.06 |
| n-Butane, mol percent | 0.07 | 0.09 |
| Isobutylene, mol percent | 18.9 | 19.1 |
| 1-butene, mol percent | 20.4 | 19.8 |
| Trans-2-butene, mol percent | 10.8 | 14.3 |
| Cis-2-butene, mol percent | 10.4 | 6.6 |
| 1,3-butadiene, mol percent | 3.0 | 2.53 |
| 1-butyne, mol percent | 0.22 | 0.23 |
| Sulfur (p.p.m.) | 25 | 25 |

TABLE II
Hydroisomerization conditions

| Run number | 1 | 2 | 3 | 4 |
|---|---|---|---|---|
| Feed, blend | A | A | A | B |
| $NH_3$ treatment of catalyst | (1) | (1) | (2) | (2) |
| Temperature, °F | 250 | 250 | 300 | 300 |
| Pressure, p.s.i.g | 110 | 110 | 110 | 110 |
| VHSV | 500 | 500 | 500 | 500 |
| $H_2$ (mol percent) | 4.7 | 7.0 | 7.0 | 4.7 |

Results

| Product hydrocarbon composition ($H_2$ free basis), mol percent: | | | | |
|---|---|---|---|---|
| Propane | 38.35 | 38.6 | 35.47 | 37.06 |
| Isobutane | 0.28 | 0.18 | 0.11 | 0.08 |
| n-Butane | 0.47 | 0.86 | 0.78 | 0.36 |
| Isobutylene | 5.9 | 4.5 | 18.7 | 19.1 |
| 1-butene | 5.2 | 10.2 | 5.4 | 6.7 |
| Trans-2-butene | 25.6 | 24.3 | 25.1 | 23.3 |
| Cis-2-butene | 15.5 | 14.3 | 14.4 | 13.4 |
| 1,3-butadiene | Nil | Nil | Nil | Nil |
| 1-butyne | Nil | Nil | Nil | Nil |
| Isobutylene dimer | 5.7 | 5.0 | <0.01 | Nil |
| Isobutylene trimer | 2.6 | 1.68 | <0.01 | Nil |
| Heavier | 0.4 | 0.08 | 0.02 | Nil |

Calculations

| Portion of isobutylene polymerized, percent of isobutylene in feed | 69 | 76 | <1 | 0 |
|---|---|---|---|---|

1 No.   2 Yes.

The above example demonstrates that our catalyst is capable of completely eliminating the production of isobutylene dimers and trimers.

EXAMPLE II

Three additional runs were carried out using the catalyst employed in Example I which had been treated with $NH_3$. After a certain period of use (about 50 hours), isobutylene dimers and trimers began to appear in the product effluent. Accordingly, in two of these runs, dimethyl formamide was added to the feed as shown below.

In a control run, the addition of dimethyl formamide was omitted. The composition of the feed, reaction conditions and results are set forth below in Tables III and IV.

TABLE III.—FEED COMPOSITION ($H_2$ FREE BASIS)

| | Run 1 | Run 2 | Run 3 |
|---|---|---|---|
| Component (mol percent): | | | |
| Propane | 37.23 | 36.49 | 36.14 |
| Isobutane | 0.06 | 0.07 | 0.06 |
| n-Butane | 0.09 | 0.09 | 0.07 |
| Isobutylene | 19.1 | 19.3 | 18.9 |
| 1-butene | 19.8 | 20.0 | 20.4 |
| t-2-butene | 14.3 | 14.5 | 10.8 |
| c-2-butene | 6.60 | 6.70 | 10.37 |
| 1,3-butadiene | 2.59 | 2.62 | 3.00 |
| 1-butyne | 0.23 | 0.23 | 0.22 |
| Sulfur (weight p.p.m.) | 25 | 25 | 25 |
| DMF (weight p.p.m.) | 25 | 30 | None |

TABLE IV
Operating conditions

| Run | 1 | 2 | 3 |
|---|---|---|---|
| Temperature, °F | 300 | 300 | 300 |
| Pressure, p.s.i.g | 110 | 110 | 110 |
| VHSV | 250 | 250 | 250 |
| $H_2$, mol percent | 7.0 | 7.0 | 7.0 |
| Operating time since $NH_3$ treatment of Pd/$Al_2O_3$, hour | 80 | 1,270 | 1,505 |
| Operating time since starting to use DMF free feed, hour | | | 222 |

Results—Product hydrocarbon composition ($H_2$ free basis)

| Component (mol percent): | | | |
|---|---|---|---|
| Propane | 37.22 | 36.41 | 35.94 |
| Isobutane | 0.13 | 0.09 | 0.09 |
| n-Butane | 0.85 | 0.70 | 0.75 |
| Isobutylene | 19.0 | 19.3 | 18.8 |
| 1-butene | 4.4 | 5.2 | 5.4 |
| t-2-butene | 25.0 | 24.5 | 24.3 |
| c-2-butene | 13.4 | 13.8 | 14.4 |
| 1,3-butadiene | Nil | Nil | Nil |
| 1-butyne | Nil | Nil | Nil |
| Heavier (all isobutylene dimer) | (1) | (1) | 0.02 |

Calculations

| Isobutylene polymerized, percent of isobutylene | 0 | 0 | 0.2 |
|---|---|---|---|

1 None.

The above example clearly demonstrates that the addition of dimethyl formamide to the feed effectively inhibits isobutylene polymerization using an ammonia treated palladium on alumina catalyst.

Reasonable variation and modification of our process and catalyst will be apparent to those skilled in the art without departing from the spirit and scope of our invention.

We claim:

1. In a process of hydroisomerizing a feed comprising at least one terminal acyclic olefin hydrocarbon having 4 to about 6 carbon atoms in the presence of added hydrogen and a hydroisomerization catalyst which is a supported noble metal of Group VIII wherein said terminal olefin is double bond isomerized to an internal olefin, the improvement comprising pretreating said catalyst with ammonia prior to contact of said catalyst with said feed wherein said process is conducted at a temperature in the range of about 225° F. to 500° F.

2. The process of claim 1 wherein said feed comprises
   (a) at least one terminal acyclic olefin hydrocarbon having 4 to about 6 carbon atoms,
   (b) a branched skeletal isomer having the same number of carbon atoms as (a), and the amount of ammonia used to contact the catalyst is sufficient to inhibit the polymerization of (b).

3. The process of claim 2 wherein the inhibition of polymerization of (b) is maintained by adding to said feed an effective amount of a nitrogen-containing material which is:

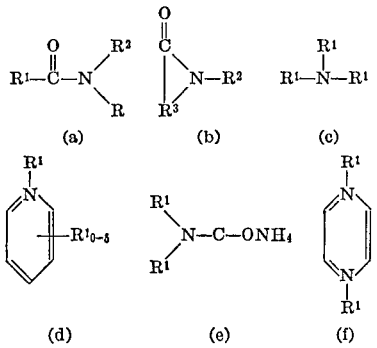

or (g) mixtures of $NH_3$ and one or more of $NH_4HCO_3$, $(NH_4)_2CO_3$, and $CO_2$ wherein $R^1$ and $R^2$ are selected from the group consisting of hydrogen, and alkyl, aryl, cycloalkyl groups and combinations of these, $R_3$ is an alkylene radical having 2–5 carbon atoms; wherein the number of carbon atoms of compounds shown in compounds (a)–(f) does not exceed about 15; and the mixture of (g) contains about 0.01–20 moles of $NH_4HCO_3$, $(NH_4)_2CO_3$, or $CO_2$ per mole of $NH_3$.

4. The process of claim 3 wherein the nitrogen-containing material is added to said feed at the start of the hydroisomerization reaction.

5. The process of claim 1 wherein said feed comprises a mixture of butene-1 and isobutylene.

6. The process of claim 3 wherein the amount of nitrogen-containing material added to said feed is in the range of about .001 to about 1,000 wt. p.p.m.

7. The process of claim 5 wherein dimethylformamide is added to said feed.

8. The process of claim 1 wherein said Group VIII metal is supported on an alumina containing support.

9. The process of claim 8 wherein said Group VIII metal is palladium.

10. The process of claim 1 wherein said feed further contains at least one sulfur-containing compound.

11. The process of claim 10 wherein said sulfur-containing compound is present to the extent of about 1 to about 50 moles p.p.m. as sulfur.

References Cited
UNITED STATES PATENTS 3,485,887  12/1969  Kronig et al. _____ 260—683.2
2,849,377  8/1958  Ogburn et al. ____ 260—683.65

DELBERT E. GANTZ, Primary Examiner

C. E. SPRESSER, Jr., Assistant Examiner

U.S. Cl. X.R.

260—677 H, 683.65